US012752935B2

(12) United States Patent
J et al.

(10) Patent No.: US 12,752,935 B2
(45) Date of Patent: Oct. 6, 2026

(54) SYSTEMS, APPARATUSES, METHODS, AND COMPUTER PROGRAM PRODUCTS FOR EFFICIENCY PREDICTIONS USING ARTIFICIAL INTELLIGENCE FRAMEWORK

(71) Applicant: Honeywell International Inc., Charlotte, NC (US)

(72) Inventors: Kirupakar J, Madurai (IN); Kalimulla Khan, Bangalore (IN); Ramkumar Rajendran, Madurai (IN); Srilakshmi Kurudi, Bangalore (IN); Sai Keshav Gaba, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/612,580

(22) Filed: Mar. 21, 2024

(65) Prior Publication Data

US 2025/0296705 A1 Sep. 25, 2025

(51) Int. Cl.

| | |
|---|---|
| ***B64F 5/60*** | (2017.01) |
| ***G06N 3/092*** | (2023.01) |
| ***G07C 5/08*** | (2006.01) |

(52) U.S. Cl.

CPC ............... *B64F 5/60* (2017.01); *G06N 3/092* (2023.01); *G07C 5/0808* (2013.01); *G07C 5/0825* (2013.01)

(58) Field of Classification Search

CPC ......... B64F 5/60; G06N 3/092; G07C 5/0808; G07C 5/0825

See application file for complete search history.

(56) References Cited

U.S. PATENT DOCUMENTS

2015/0039401 A1* 2/2015 Ricketts ........... G06Q 10/06393 705/7.39
2016/0107765 A1* 4/2016 Dani .................. G05B 23/0251 701/29.1

(Continued)

FOREIGN PATENT DOCUMENTS

CN 108304886 A 7/2018
CN 107179870 B * 7/2020 ............... G06N 5/04

(Continued)

OTHER PUBLICATIONS

Extended European Search Report Mailed on Aug. 11, 2025 for EP Application No. 25163067, 8 page(s).

*Primary Examiner* — Rufus C Point
(74) *Attorney, Agent, or Firm* — Alston & Bird LLP

(57) ABSTRACT

Embodiments of the present disclosure provide techniques for generating validated operational efficiency reports. The techniques may include receiving operational data associated with at least one vehicle operation; generating, based on the operational data and using a machine learning efficiency framework, one or more initial operational efficiency reports comprising one or more efficiency-based modification parameters configured for adjusting one or more operational parameters associated with a subsequent vehicle operation; generating one or more validated efficiency reports based on the one or more initial operational efficiency reports and using one or more simulation engines; and initiating performance of one or more prediction-based actions based on the validated efficiency reports.

18 Claims, 6 Drawing Sheets

(56) References Cited

U.S. PATENT DOCUMENTS

| | | | |
|---|---|---|---|
| 2021/0407303 A1 | 12/2021 | Yogesha et al. | |
| 2022/0324467 A1 | 10/2022 | Alvarez et al. | |
| 2023/0074139 A1* | 3/2023 | Ghosh | B60W 50/04 |

FOREIGN PATENT DOCUMENTS

| | | | | |
|---|---|---|---|---|
| CN | 112444409 A | * | 3/2021 | G06N 3/045 |
| FR | 2840356 A1 | * | 12/2003 | F01N 3/0814 |

* cited by examiner

SYSTEMS, APPARATUSES, METHODS, AND COMPUTER PROGRAM PRODUCTS FOR EFFICIENCY PREDICTIONS USING ARTIFICIAL INTELLIGENCE FRAMEWORK

TECHNOLOGICAL FIELD

The present disclosure relates, generally, to systems, apparatuses, methods, and computer program products for efficiency services and predictions. Example embodiments are directed to systems, apparatuses, methods, and computer program products for generating efficiency reports for a vehicle operation.

BACKGROUND

Various embodiments of the present disclosure address technical challenges related to efficiency services and predictions. Through applied effort, ingenuity, and innovation, Applicant has solved problems related to efficiency predictions by developing solutions embodied in the present disclosure, which are described in detail below.

BRIEF SUMMARY

In general, embodiments of the present disclosure provide methods, apparatus, systems, computing devices, computing entities, and/or the like for generating efficiency reports and/or providing efficiency services for vehicle operations using artificial intelligence/machine learning framework. Other implementations for generating efficiency reports and/or providing efficiency services for vehicle operations will be, or will become, apparent to one with skill in the art upon examination of the following figures and detailed description. It is intended that all such additional implementations be included within this description be within the scope of the disclosure and be protected by the following claims.

In accordance with an aspect of the disclosure a computing system is provided. In an example embodiment, the computing system comprises memory and one or more processors communicatively coupled to the memory, the one or more processors configured to receive operational data associated with at least one vehicle operation; generate, based on the operational data and using a machine learning efficiency framework, one or more initial operational efficiency reports comprising one or more efficiency-based modification parameters configured for adjusting one or more operational parameters associated with a subsequent vehicle operation; generate one or more validated efficiency reports based on the one or more initial operational efficiency reports and using one or more simulation engines; and initiate performance of one or more prediction-based actions based on the one or more validated efficiency reports.

In accordance with another aspect of the disclosure, a computer-implemented method is provided. In one example embodiment the computer-implemented method comprises receiving, by one or more processors, operational data associated with at least one vehicle operation; generating, by the one or more processors based on the operational data and using a machine learning efficiency framework, one or more initial operational efficiency reports comprising one or more efficiency-based modification parameters configured for adjusting one or more operational parameters associated with a subsequent vehicle operation; generating, by the one or more processors, one or more validated efficiency reports based on the one or more initial operational efficiency reports and using one or more simulation engines; and initiating, by the one or more processors, performance of one or more prediction-based actions based on the one or more validated efficiency reports.

It should be appreciated that any and/or all aspects and/or operations of the example computer-implemented methods described herein may be combinable with any other of the aspects and/or operations of any other of the example computer-implemented methods described herein.

BRIEF DESCRIPTION OF THE DRAWINGS

Figure 1:
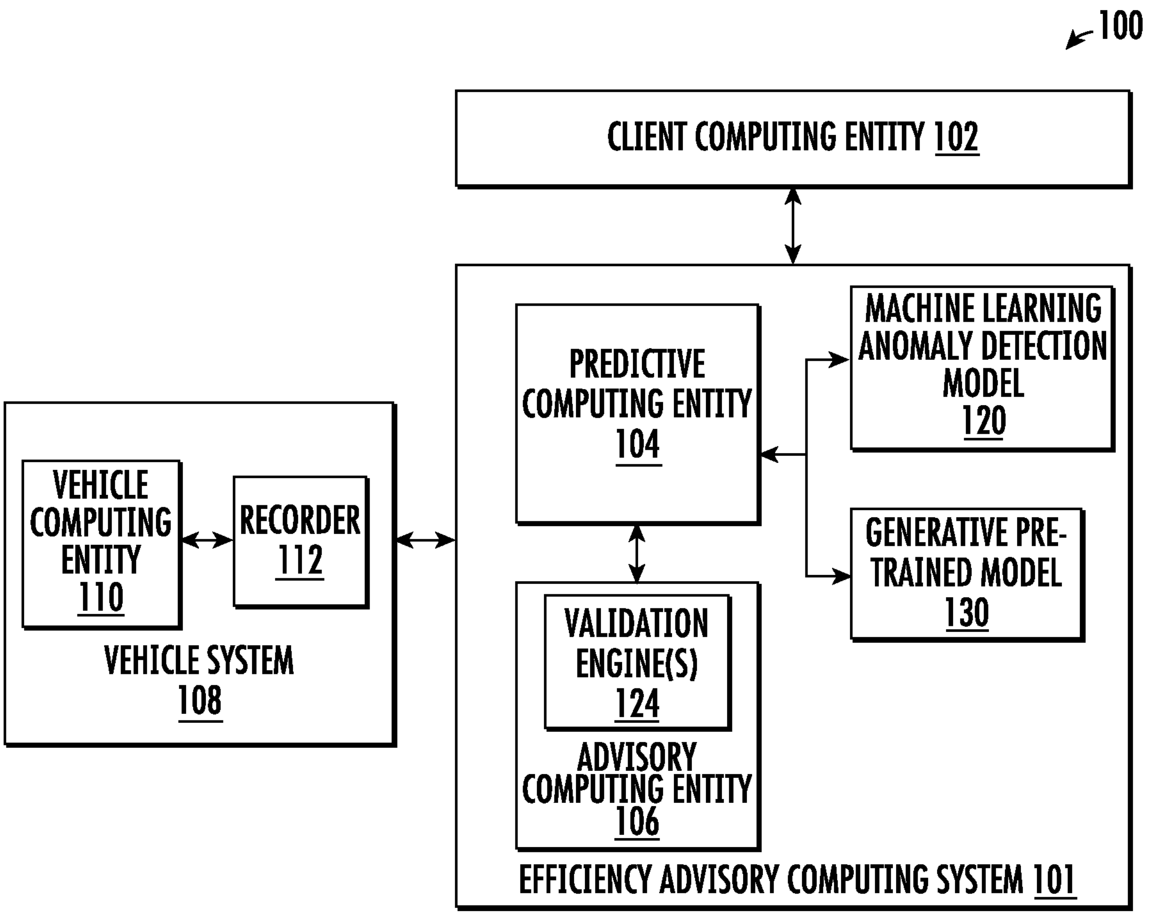
Figure 2:
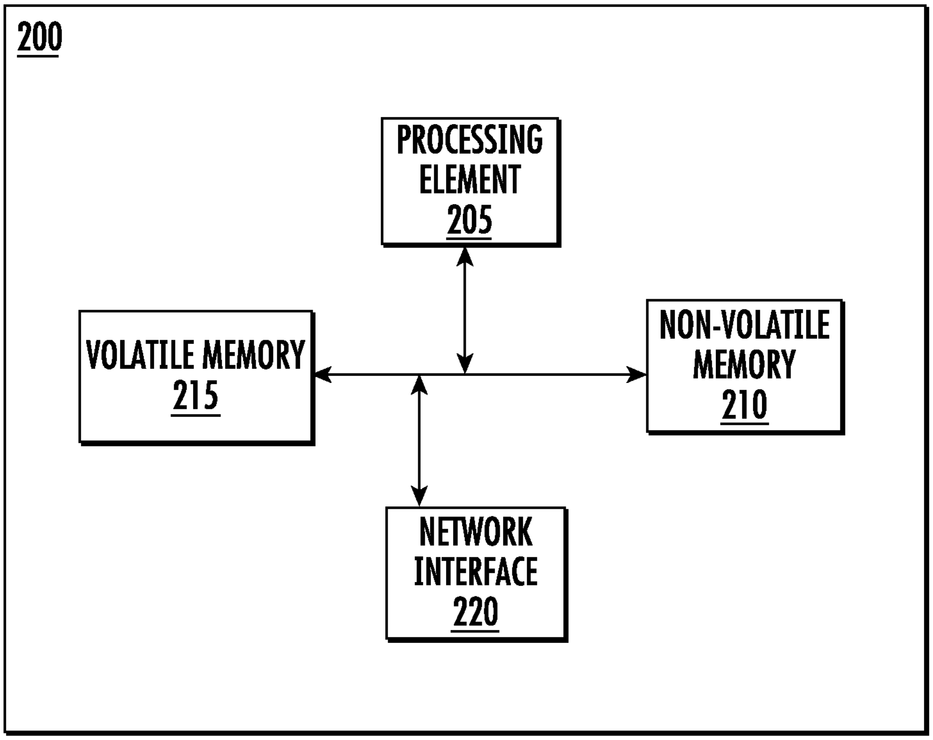
Figure 3:
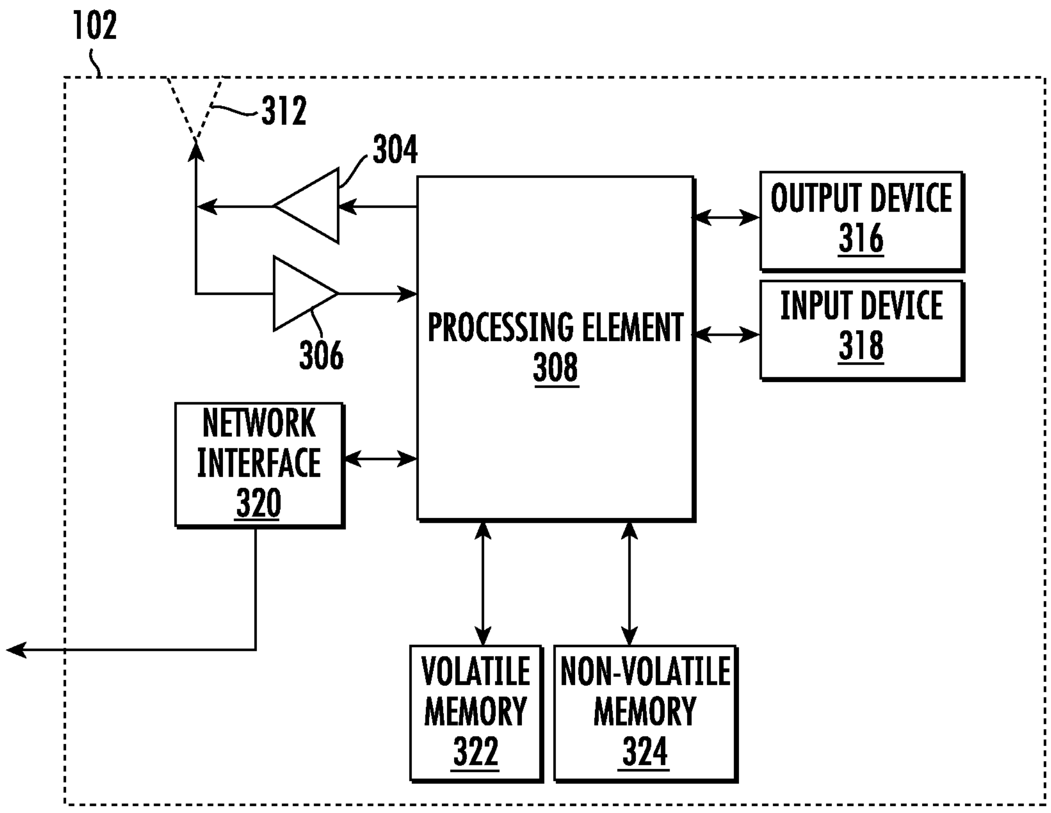
Figure 4:
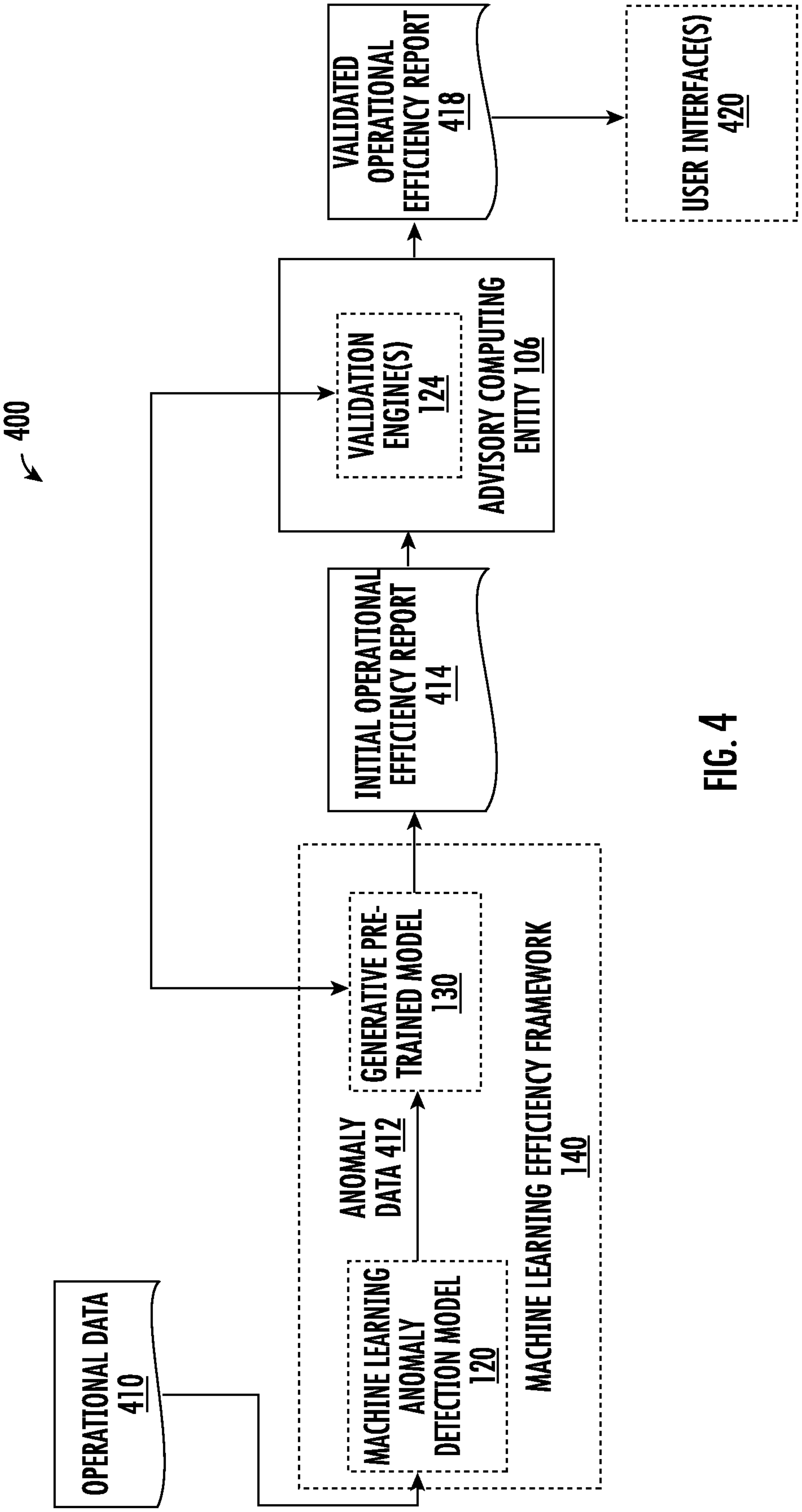
Figure 5:
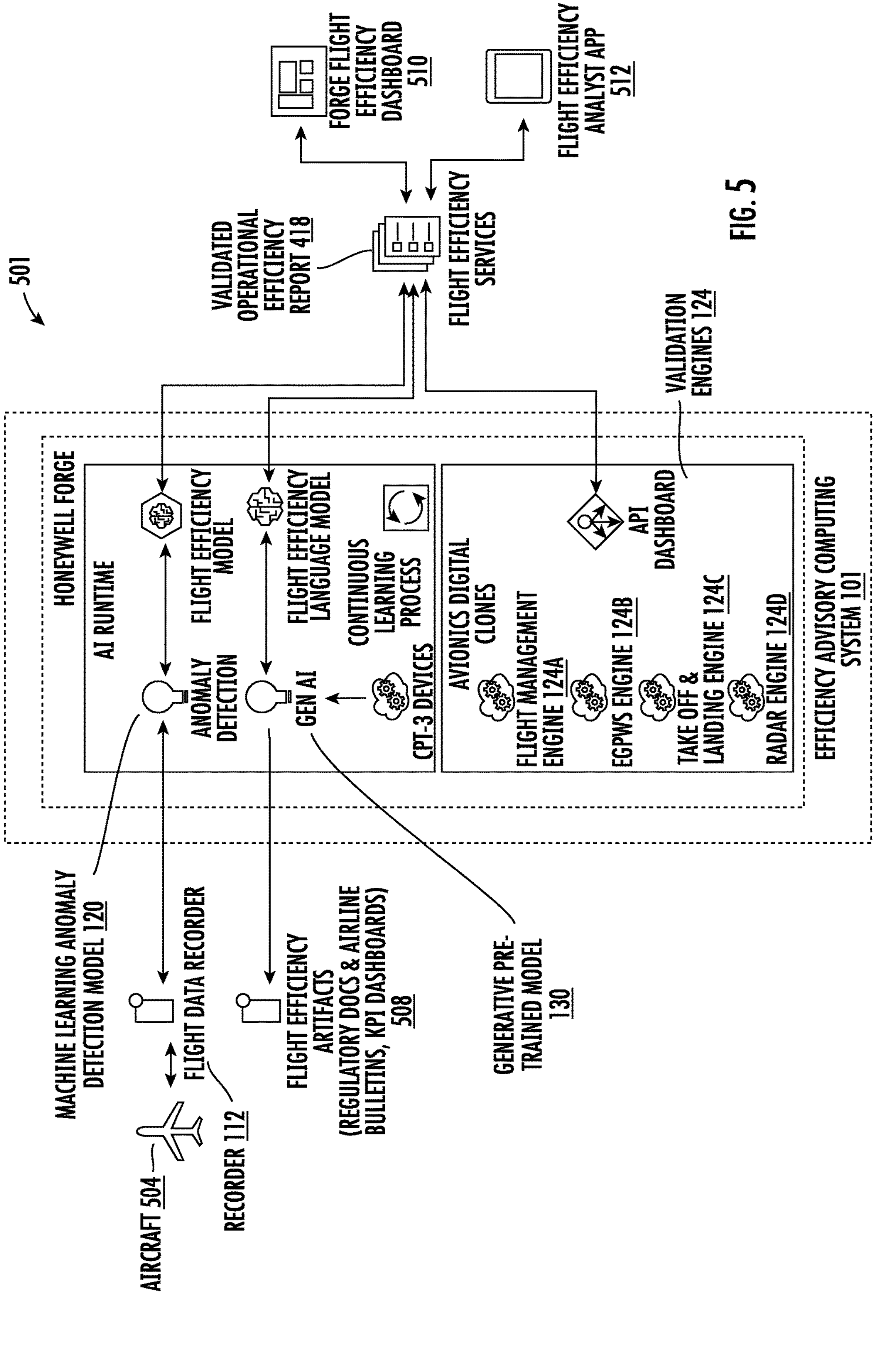

Having thus described the embodiments of the disclosure in general terms, reference now will be made to the accompanying drawings, which are not necessarily drawn to scale, and wherein:

FIG. 1 illustrates a block diagram of an example system environment within which at some embodiments of the present disclosure may operate;

FIG. 2 provides an example predictive computing entity in accordance with at least some embodiments of the present disclosure;

FIG. 3 provides an example client computing entity in accordance with some embodiments of the present disclosure;

FIG. 4 illustrates a data flow diagram showing example data structures for generating operational efficiency reports in accordance with at least some embodiments of the present disclosure;

FIG. 5 illustrates an example implementation of an advisory computing system in accordance with at least some embodiments of the present disclosure.

Figure 6:
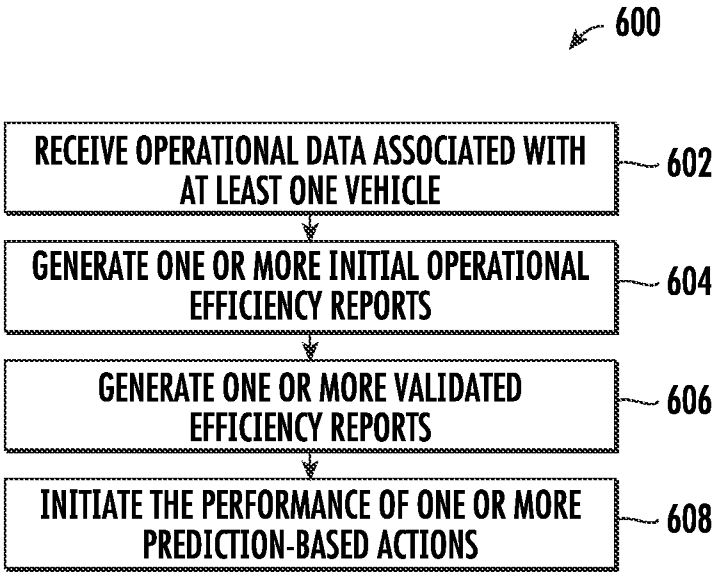

FIG. 6 is a flowchart diagram of an example process for generating operational efficiency reports in accordance with at least some embodiments of the present disclosure;

DETAILED DESCRIPTION

Embodiments of the present disclosure now will be described more fully hereinafter with reference to the accompanying drawings, in which some, but not all, embodiments of the disclosure are shown. Indeed, embodiments of the present disclosure may be embodied in many different forms and should not be construed as limited to the embodiments set forth herein, rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

Overview and Technical Improvements

Example embodiments disclosed herein address technical challenges associated with systems, apparatuses, method, and computer program products for efficiency services and/or predictions.

Operating efficiency in many applications and environments is a continuous process that needs to be refined based one or more of a variety of reasons. For example, flight efficiency in aviation industry needs to be refined based on changing flight paradigm. Many industries, including the aviation industry, need to identify solutions to keep operations efficient. Moreover, new changes in the environment or operational conditions can induce more in-efficiencies that may go un-noticed. The inventors have found that solutions such as static rule-based systems, manual systems, and semi-automated systems for flight efficiency are associated with deficiencies. In this regard, there is a need for an efficiency system that can continuously learn from operational experience (e.g., flight experience) and identify new and/or improved efficiency solutions.

Example embodiments in the present disclosure address the above-mentioned challenges and difficulties, as well as other challenges and difficulties associated with conventional efficiency systems. Example embodiments in this disclosure provide an advisory computing system 101 that leverages a machine learning efficiency framework comprising an unsupervised machine learning anomaly detection model and a reinforcement learning-based generative pre-trained model (e.g., reinforcement learning-based generative AI model) to provide operational efficiency reports. Example embodiments, generate one or more operational efficiency reports that include efficiency-related insights, efficiency-based modification parameters, new key parameter indicators (KPI), refined KPIs, and/or other relevant data that may be leveraged to improve operational efficiency, particularly with respect to vehicle operations such as, but not limited to, aircraft flight operations. Example embodiments leverage the machine learning anomaly detection model to generate anomaly data comprising outliers associated with operational data for at least one vehicle operation. Example embodiments, leverage the generative pre-trained model to generate initial efficiency reports based on the anomaly data.

Various embodiments leverage digital twins of one or more efficiency systems, safety systems, vehicle operation management systems, and/or the like to corroborate or otherwise validate the initial efficiency reports outputted from the generative pre-trained model.

Example embodiments in this disclosure leverage generative pre-trained model that is trained on training data that include domain-specific data such that the generative pre-trained model acquires domain knowledge that describes how vehicle operations (e.g., flight operations, automobile operations, and/or the like) can be adjusted to improve efficiency in various operating scenarios and/or under different conditions (e.g., weather, traffic, and/or the like). Various embodiments leverage the knowledge domain knowledge in real-time (e.g., during inference) to determine and output efficiency-related insights, efficiency-based modification parameters, and/or the like.

In this regard, in avionics domain for example, example embodiments of the present disclosure leverage reinforcement learning based AI models for predicting scenarios; digital twins to augment Flight data analytics based upon Avionics digital clones like FMS and EGPWS; as well as predictive models, crew specific dashboards and post flight efficiency KPIs.

By utilizing a machine learning efficiency framework that includes an unsupervised machine learning efficiency model trained on historical operational data and reinforcement-based generative pre-rained model trained on domain-specific knowledge, various embodiments of the present disclosure provide for continuous learning by the machine learning efficiency framework (particularly, the generative pre-trained model), which, in turn, improves the accuracy of efficiency reports, including efficiency advisories, modification parameters, and/or the like thereof.

By utilizing a machine learning efficiency framework, various embodiments provide for identifying additional key performance indicators, generating additional efficiency reports which further improves operational efficiency. Further, utilizing a machine learning efficiency framework to generate operational efficiency reports, various embodiments provide for automated, efficient, and effective efficiency services and prediction, which, in turn, reduces human effort and inaccuracies associated with manual processes.

Definitions

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

EXAMPLE SYSTEMS AND APPARATUSES OF THE DISCLOSURE

Embodiments of the present disclosure may be implemented in various ways, including as computer program products that comprise articles of manufacture, as hardware, including circuitry, configured to perform one or more functions, and/or as combinations of specific hardware and computer program products. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as one or more methods, apparatuses, systems, computing devices (e.g., user devices, servers, etc.), computing entities, and/or the like. As such, embodiments of the present disclosure may take the form of an apparatus, system, computing device, computing entity, and/or the like executing instructions stored on one or more computer-readable storage mediums to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. In embodiments in which specific hardware is described, it is understood that such specific hardware may work in conjunction with the foregoing according to the various examples described herein. Accordingly, the block diagrams and flowchart illustrations support various combinations of embodiments for performing the specified instructions, operations, or steps.

In this regard, FIG. 1 shows an example system environment 100 within which at least some embodiments of the present disclosure may operate. The depiction of the example system environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1 and the system environment 100 disclosed therein is merely presented to provide an example basis and context for the facilitation of some of the features, aspects, and uses of the methods, apparatuses, computer readable media, and computer program products disclosed and contemplated herein. It will be understood that while many of the aspects and components presented in FIG. 1 are shown as discrete, separate elements, other configurations may be used in connection with the methods, apparatuses, computer readable media, and computer programs described herein, including configurations that combine, omit, separate, and/or add aspects and/or components.

As shown in FIG. 1, the example system environment 100 includes an efficiency advisory computing system 101, one or more client computing entity 102, and one or more vehicle systems 108. The efficiency advisory computing system 101 may be configured to receive requests, such as efficiency advisory requests, from client computing entities 102, process the requests to generate operational efficiency reports, and provide the generated operational efficiency outputs to the client computing entities 102. The example system environment 100 may be used in a plurality of domains and not limited to any specific application as disclosed herewith. The plurality of domains may include avionics, industrial, manufacturing, banking, education, retail, to name a few. In particular, although avionics domain is referenced herein, the embodiments are not limited to the avionics domain. For example, embodiments described herein may apply to travel by air, land, water, and/or the like. In this regard, the system environment 100 illustrated in FIG. 1 may apply to the avionics domain, maritime domain, land transportation domain, and/or the like.

In some embodiments, the efficiency advisory computing system 101 may communicate with at least one of the client computing entities 102 and/or with at least one of the vehicle systems 108 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The efficiency advisory computing system 101 may include a predictive computing entity 104 and one or more advisory computing entities 106. The predictive computing entity 104 and the one or more advisory computing entities 106 may be individually and/or collectively configured to receive requests from client computing entities 102, process the requests to generate outputs, such as efficiency report outputs and/or the like, and provide the generated outputs to the client computing entities 102.

For example, the predictive computing entity 104 and/or one or more advisory computing entities 106 may comprise storage subsystems that may be configured to store input data, training data, output data, and/or the like that may be used by the respective computing entities to perform predictive data analysis, training operations, and/or other operations of the present disclosure. In addition, the storage subsystems may be configured to store model definition data used by the respective systems to perform various predictive data analysis and/or training tasks. The storage subsystem may include one or more storage units, such as multiple distributed storage units that are connected through a computer network. Each storage unit in the respective storage system may store at least one of one or more data assets and/or one or more data about the computed properties of one or more data assets. Moreover, each storage unit in the storage systems may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, the predictive computing entity 104 and/or advisory computing entities 106 are communicatively coupled using one or more wired and/or wireless communication techniques. The respective systems may be specially configured to perform one or more steps/operations of one or more techniques described herein. By way of example, the predictive computing entity 104 may be configured to train, implement, use, update, and/or evaluate one or more machine learning models in accordance with one or more training and/or inference operations of the present disclosure.

In some example embodiments, the predictive computing entity 104 may be configured to receive and/or transmit one or more datasets, objects, and/or the like from and/or to one or more external computing entities 108 to facilitate or perform one or more steps/operations of one or more techniques (e.g., efficiency advisory techniques, machine learning model training techniques, simulation techniques, validation techniques and/or the like) described herein. The advisory computing entities 106, for example, may include and/or be associated with one or more entities that may be configured to generate, receive, transmit, store, manage, and/or facilitate datasets that may be leveraged to facilitate or perform one or more steps/operations of one or more techniques described herein.

In some example embodiments, the predictive computing entity 104 may be configured to provide datasets including, but not limited to, initial operational efficiency reports to one or more advisory computing entities 106. The one or more advisory computing entities 106 may be configured to leverage the datasets to perform one or more steps/operations of the present disclosure such as, but not limited to validating the initial operational efficiency report outputted by the predictive computing entity. For example, the one or more advisory computing entities 106 may be configured to receive initial operational efficiency report outputs from the predictive computing entity 104 and analyze the operational efficiency outputs to validate the initial operational efficiency report outputs, wherein the validated operational efficiency reports may be provided to one or more users via one or more user interfaces (e.g., dashboards, and/or the like).

In some embodiments, an advisory computing entities 106 is a digital twin of one or more efficiency systems, vehicle operation management systems, safety systems, and/or the like. Alternatively, in some embodiments, the advisory computing entities 106 embodies or is otherwise associated with a digital twin of one or more efficiency systems, vehicle operation management systems, safety systems, and/or the like. In some embodiments, the digital twins are leveraged to validate the efficiency reports outputted by the predictive computing entity 106. For avionics domain, for example, the one or more advisory computing entities 106 may include or otherwise embody a digital twin (e.g., a software copy) of a flight management system (FMS) engine configured to provide the primary navigation, flight planning, and optimized route determination and enroute guidance for the aircraft. (e.g., provides capability and information that allows for a pilot to navigate an aircraft from take-off to landing and allows for crew members to program the FMS so that that the shortest routes can be flown to save time, fuel, and improve various other efficiency and/or safety KPIs), a digital twin of a take-off and landing engine (TOLDE), a digital twin of a radar engine, a digital twin of enhanced ground proximity warning system (EGPWS) configured to reduce the risk of controlled flight into terrain by providing flight crews with timely, accurate information about terrain and obstacles in the area (e.g., by using various aircraft inputs and an internal database to predict and warn flight crews of potential conflicts with obstacles or terrain). It would be appreciated that the above example advisory computing entities 106 are not intended to be limiting and other embodiments may include more or less, or different advisory computing entity 106 configuration.

In one example, a vehicle system 108 is an aircraft system. In some examples, the vehicle system may be associated with other vehicles such as, but not limited to, cars, trucks, boats, trains, ships, buses, or the like. In some embodiments, the one or more vehicle systems 108 is onboard a vehicle (e.g., aircraft, ship, or the like). In some example embodiments, the one or more vehicle systems 108 comprise a cockpit system or include a cockpit system. A vehicle system 108 may include a vehicle computing entity 110 and a recorder 112 configured to provide access to raw operational data. The recorder 112 may be communicatively coupled to the vehicle computing entity to, for example, send, transmit, receive and/or transmit one or more datasets, objects, and/or the like from and/or to the vehicle computing entity 110, predictive computing entity 104, and/or advisory computing entity 106 to facilitate or perform one or more steps/operations of one or more techniques described herein. The predictive computing entity 104 and/or the advisory computing entity 106, for example, may be configured to retrieve, directly or indirectly, operational data associated with a vehicle operation from the recorder 112.

In some embodiments, a recorder 112 is an electronic recording device configured to record operational data associated with a vehicle operation, such as an aircraft vehicle operation. The operational data recorded by the recorder 112 may comprise timeseries data regarding the vehicle operation. The operational data, for example, may originate from replaceable units (LRUs), actuators, valves, sensors (e.g., inertial navigation instruments, radio navigation instructions, global position systems, or the like), and/or other various components of a vehicle during operation of the vehicle. For example, the recorder 112 may comprise an electronic recording device configured to record output signals and raw data originating from line-replaceable units (LRUs), actuators, valves, sensors, and/or other various components of a vehicle that are configured to monitor various operational parameters. Additionally, the recorder 112 may be configured to receive and store any other types of data associated with vehicle operations (e.g., aircraft flight operations or the like). In this regard, the operational data may comprise output signal and/or raw data for one or more operational parameters.

Non-limiting examples of operational data include vehicle path parameters (e.g., altitude, air speed, vertical speed, and/or the like at various intervals during operation of the vehicle from a first location to a second location), temporal data (e.g., date and/or time at various intervals during operation from a first location to a second location), spatial data (e.g., geographical position data at various intervals during operation of the vehicle from a first location to a second location), vehicle component performance data (e.g., engine performance data, landing gear performance data, wing performance data, and/or the like).

In some embodiments, the recorder 112 may be configured to gather the same operational data or at least a portion of the data that a flight data recorder on board a vehicle, such as an aircraft, would gather. The recorder 112 may be configured to provide access to the operational data (e.g., flight data or the like) via one or more of a variety of techniques (e.g., via a universal serial bus (USB), cellular network, or the like). In some example embodiments, the predictive computing entity 104 and/or one or more advisory computing entities 106 may be configured to receive the operational data (or a portion of the operational data), directly or indirectly, from the recorder 112. In some embodiments, the predictive computing entity 104 may be configured to leverage the operational data to generate operational efficiency reports.

In some embodiments, such as example embodiments where the vehicle system 108 is an aircraft system, the recorder 112 may comprise a quick access recorder (QAR) configured to provide quick accesses to the operational data recorded during the vehicle operation (e.g., output signals and raw data of one or more components of the vehicle). It will be appreciated that other the vehicle system 108 may include other types of recorder 112.

In some example embodiments, the predictive computing entity 104 may be configured to generate and/or train a machine learning model, such as generative pre-trained model 130. For example, the predictive computing entity 104 (e.g., the predictive computing entity 104 thereof) may be configured to perform one or more training steps/operations of the present disclosure to train a machine learning model, as described herein. The predictive computing entity 104 may leverage the trained machine learning model to perform one or more inference steps/operations of the present disclosure.

In some example, embodiments, the machine learning model (e.g., generative pre-trained model 130) may be received from a third-party computing entity. For example, the predictive computing entity 104 may be configured to receive a trained machine learning model trained and subsequently provided by a third-party computing entity. For example, the third-party computing entity may be configured to perform one or more training steps/operations of the present disclosure to train a machine learning model, as described herein. In such a case, the trained machine learning model may be provided to the predictive computing entity 104 which may leverage the trained machine learning model to perform one or more inference steps/operations of the present disclosure.

In some examples, feedback (e.g., evaluation data, ground truth data, etc.) from the use of the machine learning model may be recorded by the advisory computing entity 106 and/or the predictive computing entity 104. In some examples, the feedback may be leveraged by the predictive computing entity 104 or third-party computing entity to continuously train the machine learning model over time. In this manner, the efficiency advisory computing system 101 may perform, via one or more combinations of computing entities, one or more prediction, training, and/or any other machine learning-based techniques of the present disclosure.

A. Example Predictive Computing Entity

FIG. 2 provides an example computing entity 200 in accordance with some embodiments of the present disclosure. The computing entity 200 is an example of the predictive computing entity 104, the advisory computing entity 106, and/or vehicle computing entity 110 as described with reference to FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, training one or more machine learning models, monitoring, evaluating, comparing, and/or similar terms used herein interchangeably. In some embodiments, these functions, operations, and/or processes may be performed on data, content, information, and/or similar terms used herein interchangeably. In some embodiments, one computing entity (e.g., predictive computing entity 104 etc.) may train and use one or more machine learning models described herein. In other embodiments, a first computing entity (e.g., predictive computing entity 104 etc.) may use one or more machine learning models that may be trained by a second computing entity (e.g., an external computing entity) which may be communicatively coupled to the first computing entity. The second computing entity, for example, may train one or more of the machine learning models described herein, and subsequently provide the trained machine learning model(s) (e.g., optimized weights, code sets, etc.) to the first computing entity over a network.

As shown in FIG. 2, in some embodiments, the computing entity 200 may include, or be in communication with, one or more processing elements 205 (also referred to as processors, processing circuitry, and/or similar terms used herein interchangeably) that communicate with other elements within the computing entity 200 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the computing entity 200 may further include, or be in communication with, non-volatile media (also referred to as non-volatile storage, memory, memory storage, memory circuitry, and/or similar terms used herein interchangeably). In some embodiments, the non-volatile media may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile media may store databases, database instances, database management systems, data, applications, programs, program modules, scripts, code (e.g., source code, object code, byte code, compiled code, interpreted code, machine code, etc.) that embodies one or more machine learning models or other computer functions described herein, executable instructions, and/or the like. The term database, database instance, database management system, and/or similar terms used herein interchangeably, may refer to a collection of records or data that is stored in a computer-readable storage medium using one or more database models; such as a hierarchical database model, network model, relational model, entity-relationship model, object model, document model, semantic model, graph model, and/or the like.

In some embodiments, the computing entity 200 may further include, or be in communication with, volatile media (also referred to as volatile storage, memory, memory storage, memory circuitry, and/or similar terms used herein interchangeably). In some embodiments, the volatile media may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, code (source code, object code, byte code, compiled code, interpreted code, machine code) that embodies one or more machine learning models or other computer functions described herein, executable instructions, and/or the like being executed by, for example, the processing element 205. Thus, the databases, database instances, database management systems, data, applications, programs, program modules, code (source code, object code, byte code, compiled code, interpreted code, machine code) that embodies one or more machine learning models or other computer functions described herein, executable instructions, and/or the like may be used to control certain aspects of the operation of the computing entity 200 with the assistance of the processing element 205 and operating system.

As indicated, in some embodiments, the computing entity 200 may also include one or more network interfaces 220 for communicating with various computing entities (e.g., the client computing entity 102, external computing entities, etc.), such as by communicating data, code, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In some embodiments, the computing entity 200 communicates with another computing entity for uploading or downloading data or code (e.g., data or code that embodies or is otherwise associated with one or more machine learning models). Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing entity 200 may include, or be in communication with, one or more input elements, such as a keyboard input, a mouse input, a touch screen/display input, motion input, movement input, audio input, pointing device input, joystick input, keypad input, and/or the like. The computing entity 200 may also include, or be in communication with, one or more output elements (not shown), such as audio output, video output, screen/display output, motion output, movement output, and/or the like.

B. Example Client Computing Entity

FIG. 3 provides an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the computing entity 200. In some embodiments, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the computing entity 200 via a network interface 320.

Via these communication standards and protocols, the client computing entity 102 may communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download code, changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface (that may include an output device 316 (e.g., display, speaker, tactile instrument, etc.) coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the computing entity 200, as described herein. The user input interface may comprise any of a plurality of input devices 318 (or interfaces) allowing the client computing entity 102 to receive code and/or data, such as a keypad (hard or soft), a touch display, voice/speech or motion interfaces, or other input device. In some embodiments including a keypad, the keypad may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory may store databases, database instances, database management systems, data, applications, programs, program modules, scripts, code (source code, object code, byte code, compiled code, interpreted code, machine code, etc.) that embodies one or more machine learning models or other computer functions described herein, executable instructions, and/or the like to implement the functions of the client computing entity 102. As indicated, this may include a user application that is resident on the client computing entity 102 or accessible through a browser or other user interface for communicating with the computing entity 200 and/or various other computing entities.

In another embodiment, the client computing entity 102 may include one or more components or functionalities that are the same or similar to those of the computing entity 200, as described in greater detail above. In one such embodiment, the client computing entity 102 downloads, e.g., via network interface 320, code embodying machine learning model(s) from the computing entity 200 so that the client computing entity 102 may run a local instance of the machine learning model(s). As will be recognized, these architectures and descriptions are provided for example purposes only and are not limited to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

EXAMPLE SYSTEM OPERATIONS

As indicated, various embodiments of the present disclosure make important technical contributions to operational efficiency prediction techniques. In particular, systems and methods are disclosed herein that implement a specially-configured machine learning framework for improving operational efficiency associated with vehicle operation (e.g., vehicle travel). By doing so, the machine-learning approach may provide an improvement in machine learning that may be practically applied to improve various computing tasks.

FIG. 4 illustrates a data flow diagram 400 showing example data structures for generating operational efficiency reports in accordance with at least some embodiments of the present disclosure. As shown in FIG. 4, in some embodiments, operational data 410 associated with at least one vehicle operation is received. The at least one vehicle operation may be associated with a vehicle profile (e.g., make, model, size, weight, manufacturer, and/or the like) of one or more vehicle profiles. For example, the operational data 410 may comprise operational data for a plurality of vehicle operations, each associated with the same vehicle profile (e.g., aircrafts of the same make, model size, weight, etc.).

In some embodiments, a vehicle operation describes movement by a vehicle (e.g., aircraft, ship, automobile, motorcycle, train, forklift, or the like) from a first location to a second location. In some embodiments, a vehicle operation may include conveyance or otherwise transportation of one or more objects (e.g., animate objects such as people, animals, and/or the like and/or inanimate objects such as luggage, containers, and/or the like) from a first location to a second location via a vehicle configured to convey such objects. Examples of a vehicle operation include, but not limited to, an aircraft flight from a first city to a second city, an automobile drive from a first city to another city, a motorcycle drive from a first town to a second town, or the like.

One or more operational parameters may be monitored during a vehicle operation and stored in a storage space. The one or more operational parameters may be stored in a manner that they may be retrieved or otherwise accessed at least post vehicle operation (e.g., after an aircraft lands, an automobile reaches its destination, or the like). It should be understood, that in some embodiments, the one or more operational parameters may be accessed during the vehicle operation.

The operational data 410, for example, may be received, directly or indirectly, by the advisory computing system 101 from a recorder 112 (e.g., a QAR or the like) onboard the vehicle. In some embodiments, the operational data 410 may comprise timeseries data associated with the at least one vehicle operation. For example, the recorder 112 may be configured to gather timeseries data for each of one or more operational parameters with respect to the at least one vehicle operation. For example, the operational data 410, may comprise data for a plurality of operational parameters with respect to the at least one vehicle operation.

Non-limiting examples of operational data 410 include altitude, air speed, vertical speed, and/or the like at various intervals during operation of the vehicle from a first location to a second location; temporal data (e.g., date and/or time) at various intervals during operation of the vehicle from the first location to the second location); geographical position data at various intervals during operation of the vehicle from the first location to a second location; engine performance data; fuel consumption, and/or the like.

In some embodiments, the operational data may comprise raw data (e.g., raw flight data) output by one or more sensors (e.g., inertial navigation instruments, radio navigation instructions, global position systems, or the like), wherein the recorder 112 may gather and otherwise collect the operational data in the raw form outputted by the one or more sensors (e.g., monitoring sensors, GPS, and/or the like). Additionally, the advisory computing system 101 may receive the operational data 410 in the raw form. It will be appreciated that the operational data 410 may depend on the prediction domain. For example, the operational data 410 may vary based on the domain (e.g., avionics, maritime, land transportation, manufacturing, or the like)

In some embodiments, one or more initial operational efficiency reports is generated based on the operational data and using a machine learning efficiency framework 140. In some embodiments, the one or more initial operational efficiency reports includes one or more efficiency-based modification parameters configured for adjusting one or more operational parameters associated with a subsequent vehicle operation. Alternatively or additionally, the one or more initial operational efficiency reports may include one or more efficiency alerts, one or more unique KPIs (e.g., new KPIs), efficiency insights, anomaly data, root cause data, recommended corrective action data, efficiency advisories, and/or other data that may be leveraged to improve efficiency of a vehicle operation.

In some embodiments, the machine learning efficiency framework 140 comprises a machine learning anomaly detection model 120 and a generative pre-trained model 130. In some embodiments, the generative pre-trained model 130 is a reinforcement-based model. In some embodiments, the machine learning anomaly detection model 120 is configured to analyze the operational data 410 to generate anomaly data 412 comprising one or more outlier data items identified from the operational data 410 or otherwise associated with the operational data 410. In some embodiments, the generative pre-trained model is configured to perform one or more scenario modeling tasks/operations based on the anomaly data to generate the one or more efficiency-based modification parameters. For example the generative pre-trained model may be configured to perform a one or more scenario modeling tasks/operations based on the anomaly data to generate the initial operational efficiency report which may include one or more efficiency-based modification parameters, one or more efficiency alerts, one or more unique KPIs (e.g., new KPIs), efficiency insights, anomaly data, root cause data, recommended corrective action data, efficiency advisories, and/or other data that may be leveraged to improve efficiency of a vehicle operation.

In some embodiments, a machine learning efficiency framework 140 is a data entity that describes parameters, hyper-parameters, and/or defined operations of a rules-based algorithm and/or machine learning model (e.g., model including at least one or more rule-based layers, one or more layers that depend on trained parameters, coefficients, and/or the like), and/or the like. The machine learning efficiency framework 140 comprises at least two models that are communicatively in that the output of one model is input to another model. The machine learning efficiency framework 140 may be configured, trained, and/or the like to generate an initial operational efficiency report 414 based on operational data 410 associated with at least one vehicle operation. The machine learning efficiency framework 140 may include one or more supervised, unsupervised, semi-supervised, reinforcement learning models, and/or the like. In some example embodiments, the machine learning efficiency framework 140 includes a machine learning anomaly detection model 120 and a generative pre-trained model 130.

In some embodiments, the machine learning anomaly detection model 120 is a data entity that describes parameters, hyper-parameters, and/or defined operations of a rules-based algorithm and/or machine learning model (e.g., model including at least one or more rule-based layers, one or more layers that depend on trained parameters, coefficients, and/or the like), and/or the like. The machine learning anomaly detection model 120 may include any type of machine learning model configured, trained, and/or the like to generate an intermediate output such as anomaly data for at least one vehicle operation based on operational data for the at least one vehicle operation. The machine learning anomaly detection model 120 may include one or more of any type of machine learning models including one or more supervised, unsupervised, semi-supervised, reinforcement learning models, and/or the like. In some embodiments, the machine learning anomaly detection model 120 is an unsupervised model.

In some embodiments, the machine learning anomaly detection model 120 is trained based on historical operational data associated with a plurality of historical vehicle operations. For example, the machine learning anomaly detection model 120 may be trained based on historical timeseries data obtained from a recorder 112 onboard a vehicle, such as a QAR. Such historical operational data may include altitude, air speed, vertical speed, and/or the like at various intervals during historical vehicle operation of a vehicle from a first location to a second location; temporal data (e.g., date and/or time) at various intervals during historical vehicle operation of the vehicle from the first location to the second location; geographical position data at various intervals during historical vehicle operation of the vehicle from the first location to a second location; engine performance data; fuel consumption, and/or the like.

In some embodiments, the generative pre-trained model 130 is a data entity that describes parameters, hyper-parameters, and/or defined operations of a rules-based algorithm and/or machine learning model (e.g., model including at least one or more rule-based layers, one or more layers that depend on trained parameters, coefficients, and/or the like), and/or the like. The generative pre-trained model 130 may be configured, trained, and/or the like to generate an initial operational efficiency report 414 based on anomaly data associated with at least one vehicle operation. The generative pre-trained model 130 may include one or more of any type of machine learning models including one or more supervised, unsupervised, semi-supervised, reinforcement learning models, and/or the like. In some embodiments, the generative pre-trained model may comprise a plurality of domain models (e.g., suite of generative pre-trained models)

In some embodiments, the generative pre-trained model 130 comprises a reinforcement model. For example, the generative pre-trained model 130 may be a reinforcement learning-based model. In some embodiments, the generative pre-trained model 130 may be trained using reward-based reinforcement learning methods. For example, the generative pre-trained model 130 may be a reinforcement learning-based generative AI model that operates on feedback acquired from output of one or more validation operations performed with respect to output of the generative pre-trained model 130, as further described herein. In some embodiments, the generative pre-trained model 130 may be updated, fine-tuned, re-trained, and/or the like based on the reward mechanism such that the generative pre-trained model 130 is continuously learning and improved.

In some embodiments, the training data for the generative pre-trained model 130 comprise domain-specific data. As an example, for an avionics domain, the training data may include, but not limited to, fuel efficiency KPIs, regulatory documents, crew fuel policies and performance, flight efficiency regulatory documents, Industry aviation reports, flight crew operations manager, flight data recording manuals, QAR data frame layout, crew roaster, company efficiency polices, FDM reports, efficiency KPI dashboards, and/or the like For example, the generative pre-trained model may be trained based on domain-specific data to acquire domain knowledge, such that the domain knowledge can be leveraged to understand or otherwise realize anomaly data output received from the machine learning anomaly detection model 120.

For example, in the avionics domain, the generative pre-trained model may be trained with the training data described above and tuned with the assistance of domain experts using, for example, FMS engines/components, EGPWS engines/components and/or validated using public datasets. The hyper parameter tuning may be dependent on the domain the expertise and the above mentions engines/components (e.g., FMS, EGPWS) functionalities which may allow to baseline the expectation criteria. In example embodiments where the generative pre-trained model 130 includes a plurality of domain models, each domain model may be trained based on the training data (described above) individually or collectively with one or more other domain models. The generative pre-trained model may be stored, in a model repository (e.g., avionics model store) which may be a repository of various domain models pre-built for heterogeneous application needs over different application requirements. In some embodiments, each domain model may be configured to expose its capability using metadata including number of of hyper parameters, training data size, context, and/or the like.

In some embodiments, the generative pre-trained model 130 and/or the domain models thereof is tuned with hyper-parameters to improve its accuracy on the user's query utterances over the period. In some embodiments, the domain models may be wrapped within a micro-service (e.g., efficiency cognitive service) which may then be injected as part of the connected FMS microservices suite.

The efficiency advisory computing system 101 may embody the efficiency cognitive service(s) comprising the generative pre-trained model 130 (e.g., the domain model(s) thereof). Each efficiency cognitive service may be configured to have sufficient contextual knowledge related to the other peer FMS Core microservices and third-party service to satisfy any user request related to avionics functionality. In some embodiments, this service will be advertising its capability to an avionics service mesh to enable service discovery capabilities. In example embodiments, by adding this cognitive interface to the existing flight efficiency advisory systems provides AI and machine-learning capability to satisfy a wide-range of user needs by understanding them.

In this regard, in some embodiments, an efficiency cognitive suite includes a generative pre-trained model 130 (e.g., reinforcement-learning based generative AI model) that learns from the historical flight data and creates domain knowledge (e.g., a knowledge base) of how flights can be tweaked to gain Fuel efficiency in various flight regimes and external factors like weather, traffic etc. For example, the generative pre-trained model 130 may comprise one or more large language models (LLMs) configured to learn via various flight operations and fuel Efficiency-related documents like regulatory documents, aircraft performance manuals, fuel dashboards, airport and air traffic controller rules and policies, etc. to build a comprehensive model for all aspects of flight efficiency. The model (e.g., generative pre-trained model 130) can evaluate various combination of methods/measures to answer queries related to fuel efficiency and/or other efficiency parameters.

In some embodiments, the anomaly data 412 comprise portions of the operational data 410 identified as outliers (e.g., outlier data items). For example, the anomaly data 412 may comprise output signals and/or raw data output retrieved from the recorder 112 that are identified as outliers by the machine learning anomaly detection model 120.

In some embodiments, an efficiency-based modification parameter is output of a model, such as a generative pre-trained model 130 that is configured for adjusting one or more operational parameters of a vehicle operation prior to commencement of the vehicle operation and/or during operation of the vehicle operations. For example, an efficiency-based modification parameters may be applied to one or more operational parameters of a vehicle to improve the efficiency such as fuel efficiency, vehicle operation duration (e.g., flight duration) and/or the like. associated with a subsequent vehicle operation. For example, the one or more efficiency-based modification parameters may be applied to subsequent vehicle operations having a similar vehicle profile as the vehicle operation whose operational data was received by the advisory computing system 101 and leveraged to generate the efficiency-based modification parameters using the machine learning framework 140. In some embodiments, a subsequent vehicle operation describes a vehicle operation that has not occurred (e.g., an aircraft flight that has not occurred, which may or may not have currently been scheduled).

In some embodiments, one or more validated efficiency reports is generated based on the one or more initial operational efficiency reports and using one or more validation engines. For example, a validation engine configured via hardware, software, firmware, and/or a combination thereof, may be leveraged to validate the initial operational efficiency reports. In some embodiments, a validation engine is configured via software and may comprise one or more specially-configured algorithms for validating an initial operational efficiency report output of the generative pre-trained model 130. In some embodiments, the one or more validation engines may comprise a digital twin (e.g., a software copy of one or more systems, engines, databases, and/or the like. For example, the one or more validation engines may comprise digital twins of one or more efficiency systems and/or safety systems such as a digital twin of an FMS engine (e.g., configured to provide the primary navigation, flight planning, and optimized route determination and en route guidance for the aircraft), a digital twin of a TOLDE, a digital twin of a radar engine, a digital twin of EGPWS (e.g., configured to reduce the risk of controlled flight into terrain by providing flight crews with timely, accurate information about terrain and obstacles in the area, and/or the like) may be configured to enable high-fidelity information for what-if analysis. The one or more validation engines may receive the initial operational efficiency report and perform or more validation operations and generate an output indicating whether the initial operational efficiency report 414 is validated or whether the initial operational efficiency report 414 is not validated.

Alternatively or additionally, the validation engines may be configured to support scenario modeling task performed by the generative pre-trained model via, for example, simulation of one or more operating scenarios and evaluating the impact with respect to one or more parameters/constraints (e.g., fuel, time, and/or the like in aviation example).

In some embodiments, the advisory computing system 101, using the machine learning anomaly detection model 120, generative pre-trained model 130, and the one or more validation engines may combine one or more efficiency insights, efficiency-based modification parameters, and/or the like output by the generative pre-trained model 130 and augment or otherwise corroborate them with other relevant information related to the vehicle operation (e.g., provided via the validation engines) to generate refined efficiency-based modification parameters, refined efficiency insights and/or additional insights to improve overall efficiency of vehicle operation.

For avionics domain, for example, the initial operational efficiency reports (e.g., including efficiency insights) output from the generative pre-trained model 130 are evaluated with digital avionics twins to assess the impact and corroborate the insights. In various embodiments, this capability allows for providing more than a probable set of answers to the queries (e.g., vehicle operation efficiency queries). The Flight Management Engine (FME), EGPWS Engine, TCAS Engine, may serve as digital twins that enable high-fidelity information for what-if analysis. In some embodiments, these engines support scenario modeling, that provide simulation of different flight efficiency scenarios during the flight and assess their impact with respect to fuel and time. Applications and/users can utilize these digital twins to corroborate the insights and provide high fidelity predictions of their impact to the Flight operations. Examples of queries that the generative pre-trained model 130 may be configured to provide a query response to include, but not limited to. what would be the taxi-time for RW 9L today? Which flight level can give me best Fuel efficiency? How much Fuel can be saved with reduced Flap operations in Airport XXX?, What is the risk of making the Flight Schedule? What is the discretionary fuel I should carry for my Flight today? Will I be able to meet my scheduled ETA today? How can I recover 15 mins of Flight time during my Flight? How can I save 100 kg Fuel during my Flight? Which is the most fuel-efficient Departure procedure today? What are the Fuel Efficiency KPI's and their potential Fuel savings applicable for my Flight today.

For example, the generative pre-trained model may be configured to support queries related to, but not limited to, predictive flight parameter analysis for better fuel/time planning, operational insights for flight optimization, assessment of the impact of fuel policy changes, assessment of the fuel risk to the flight based on external factors, and/or the like.

In some embodiments, performance of one or more prediction-based actions is initiated based on the validated efficiency reports. In some embodiments, the one or more prediction-based actions comprises causing display of at least a portion of the one or more validated efficiency reports on a user interface based on the validated efficiency reports. In some embodiments, the one or more prediction-based actions comprises causing one or more alerts to be transmitted to one or more computing entities based on the validate efficiency reports. In some embodiments, the one or more prediction-based actions comprises programmatically adjusting the one or more operational parameters associated with the subsequent vehicle operation based on the one or more efficiency-based modification parameters.

In some embodiments, a query may be received from a computing entity during a vehicle operation (e.g., subsequent vehicle operation). In some embodiments, a query response may be generated in response to the query using the generative pre-trained model. In some embodiments, the query may be provided to the one or more responses to the computing entity. For example, the query response may be generated via the generative pre-trained model 130 in real-time and provided to the client computing entity 102 (e.g., via a user interface) such that a user (e.g., pilot, driver, etc.) may view of otherwise access the query response. In some embodiments, the query response may comprise one or more efficiency insights, For example, the generative pre-trained model 130 may be configured to perform, one or more scenario modeling tasks to identify one or more efficiency insights, one or more efficiency-based modification parameters, and/or the like corresponding to the query and provide the query response comprising the one or more efficiency insights, one or more efficiency-based modification parameters, and/or the like to the client computing entity 102.

As described above, the generative pre-trained model may be trained on domain-specific data such that the generative pre-trained model 130 learns, acquires or otherwise develops domain knowledge that, for example, describes how vehicle operations can be adjusted to improve efficiency in various operating scenarios and/or under different conditions (e.g., weather, traffic, and/or the like). In this regard, the generative pre-trained model may be configured to leverage the domain knowledge in real-time (e.g., during inference) to determine and output the one or more efficiency insights, one or more efficiency-based modification parameters, and/or the like.

FIG. 5 illustrates an example implementation of an advisory computing system 101 in accordance with at least some embodiments of the present disclosure. Specifically, FIG. 5 illustrates an efficiency advisory computing system 501 which may be used in an avionics domain. While the efficiency advisory computing system 501 may illustrate one or more components not shown in FIG. 1, include more or less components, or illustrated differently, it should be understood, that the efficiency advisory computing system 501 is configured to perform the same functions associated with the efficiency advisory computing system 101 in the same manner as described above with reference to the efficiency advisory computing system 101.

As shown in FIG. 5, advisory computing system 501 includes a machine learning anomaly detection model 120 (e.g., as described above) and a generative pre-trained model 130 (e.g., as described above). The machine learning anomaly detection model 120 may be configured to receive, directly or indirectly (e.g., via predictive computing entity 104) operational data recorded by the recorder 112 (e.g., QAR or other flight data recorder) onboard an aircraft 504 or otherwise associated with the aircraft 504 to generate anomaly data associated with the operational data.

The generative pre-trained model 130 may be trained based on training data 508 that includes domain-specific data such as fuel efficiency KPIs, regulatory documents (e.g., AC120), crew fuel policies and performance data, and/or the like.

As further shown in FIG. 5, the advisory computing system 501 includes a plurality of validation engines 124, including FMS engine 124A, EGPWS engine 124B, TOLDE 124C, and/or radar engine 124D which each comprise digital twins of the one or more efficiency systems and/or safety systems (e.g., digital twins of FMS system, EGPWS, TOLDE, and/or radar system).

The advisory computing system 501 may be configured to leverage the validation engines 124 to perform one or more validation operations based on the initial operational efficiency report output of the generative pre-trained model to generate one or more validated efficiency reports 418 (e.g., also referred to as efficiency services). The one or more validated efficiency reports 418 may be substantially the same or may include one or more refined efficiency insights, refined efficiency-based modification parameters, refined KPIs, and/or the like. For example, the one or more validated efficiency reports may comprise at least a subset of the one or more efficiency-based modification parameters. In some examples, the one or more validated efficiency reports 418 may comprise one or more refined efficiency-based modification parameters corresponding to the one or more efficiency-based modification parameters associated with the one or more initial operational efficiency reports.

The validated efficiency report 418 may be provided to one or more client computing entities via one or more user interfaces, dashboards 510, applications 512 (e.g., flight efficiency analyst app) and/or the like. The one or more client computing entities may be associated with one or more users including, for example, flight efficiency analyst. The flight efficiency analyst, for example, may review, analyze, edit, or the like the validated efficiency report 418.

FIG. 6 is a flowchart diagram of an example process 600 for generating operational efficiency reports for vehicle operations. FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process includes at step/operation 602 receiving operational data associated with at least one vehicle operation. For example, the advisory computing system 101 (e.g., predictive computing entity 104 thereof) may receive operational data associated with at least one vehicle operation, directly or indirectly (e.g., via vehicle computing entity 110) from a recorder 112 associated with the at least one vehicle operation. In some embodiments, the operational data comprises timeseries data associated with the at least one vehicle operation. For example, the recorder 112 may be configured to gather timeseries data for each of one or more operational parameters with respect to the at least one vehicle operation. In some embodiments, the operational data may comprise raw data (e.g., raw flight data) output by one or more sensors (e.g., inertial navigation instruments, radio navigation instructions, global position systems, or the like), actuator, valves, and/or other components of the vehicle(s) associated with the at least one vehicle operation.

In some embodiments, the process includes at step/operation 604, one or more initial operational efficiency reports. For example, the advisory computing system 101 (e.g., predictive computing entity 104 thereof) based on the operational data and using a machine learning efficiency framework may generate one or more initial operational efficiency reports. In some embodiments, the one or more initial operational efficiency reports includes one or more efficiency-based modification parameters configured for adjusting one or more operational parameters associated with a subsequent vehicle operation. Alternatively or additionally, the one or more initial operational efficiency reports may include one or more efficiency alerts, one or more unique KPIs (e.g., new KPIs), efficiency insights, anomaly data, root cause data, recommended corrective action data, efficiency advisories, and/or other data that may be leveraged to improve efficiency of a vehicle operation.

In some embodiments, the machine learning efficiency framework comprises a machine learning anomaly detection model and a generative pre-trained model. In some embodiments, the generative pre-trained model is a reinforcement-based model. In some embodiments, the machine learning anomaly detection model is configured to analyze the operational data to generate anomaly data comprising one or more outlier data items identified from the operational data or otherwise associated with the operational data.

In some embodiments, the generative pre-trained model is configured to perform one or more scenario modeling tasks/operations based on the anomaly data to generate the one or more efficiency-based modification parameters. For example the generative pre-trained model may be configured to perform a one or more scenario modeling tasks/operations based on the anomaly data to generate the initial operational efficiency report which may include one or more efficiency-based modification parameters, one or more efficiency alerts, one or more unique KPIs (e.g., new KPIs), efficiency insights, anomaly data, root cause data, recommended corrective action data, efficiency advisories, and/or other data that may be leveraged to improve efficiency of a vehicle operation.

In some embodiments, the process 600 includes at step/operation 606, generating one or more validated efficiency reports. For example, the advisory computing system 101 (e.g. the predictive computing entity 104 and/or advisory computing entity 106 thereof) may generate based on the one or more initial operational efficiency reports and using one or more validation engines, one or more validated efficiency reports. In some embodiments, a validation engine is configured via software and may comprise one or more specially-configured algorithms for validating an initial operational efficiency report output of the generative pre-trained model 130. For example, the one or more validation engines may comprise a digital twin (e.g., a software copy of one or more systems, engines, databases, and/or the like. For example, the one or more validation engines may comprise digital twins of one or more efficiency systems and/or safety systems such as a digital twin of an FMS engine, digital twin of a TOLDE, digital twin of a radar engine, digital twin of EGPWS, and/or the like.

The one or more validation engines may be configured to receive the initial operational efficiency report and perform or more validation operations and generate an output indicating whether the initial operational efficiency report is validated or whether the initial operational efficiency report is not validated. Alternatively or additionally, the validation engines may be configured to support scenario modeling task performed by the generative pre-trained model via, for example, simulation of one or more operating scenarios and evaluating the impact with respect to one or more parameters/constraints (e.g., fuel, time, and/or the like in aviation example).

In some embodiments, the advisory computing system 101, using the machine learning anomaly detection model, generative pre-trained model 130, and the one or more validation engines may combine one or more efficiency insights, efficiency-based modification parameters, and/or the like output by the generative pre-trained model 130 and augment or otherwise corroborate them with other relevant information related to the vehicle operation (e.g., provided via the validation engines) to generate refined efficiency-based modification parameters, refined efficiency insights and/or additional insights to improve overall efficiency of vehicle operation.

In some embodiments, the process includes at step/operation 608, initiating the performance of one or more prediction-based actions. For example, the advisory computing system 101 (e.g. the predictive computing entity 104 and/or advisory computing entity 106 thereof) may initiate the performance of one or more prediction-based actions based on the validated efficiency reports. In some embodiments, the one or more prediction-based actions comprises causing display of at least a portion of the one or more validated efficiency reports on a user interface based on the validated efficiency reports. In some embodiments, the one or more prediction-based actions comprises causing one or more alerts to be transmitted to one or more computing entities based on the validate efficiency reports. In some embodiments, the one or more prediction-based actions comprises programmatically adjusting the one or more operational parameters associated with the subsequent vehicle operation based on the one or more efficiency-based modification parameters.

In some embodiments, a query may be received from a computing entity during a vehicle operation (e.g., subsequent vehicle operation). In some embodiments, a query response may be generated in response to the query using the generative pre-trained model. In some embodiments, the query may be provided to the one or more responses to the computing entity. For example, the query response may be generated via the generative pre-trained model 130 in real-time and provided to the client computing entity 102 (e.g., via a user interface) such that a user (e.g., pilot, driver, etc.) may view of otherwise access the query response. In some embodiments, the query response may comprise one or more efficiency insights,

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computing system comprising memory and one or more processors communicatively coupled to the memory, the one or more processors configured to:

receive operational data associated with at least one vehicle operation;

generate, based on the operational data and using a machine learning efficiency framework, one or more initial operational efficiency reports comprising one or more efficiency-based modification parameters configured for adjusting one or more operational parameters associated with a subsequent vehicle operation;

generate one or more validated efficiency reports based on the one or more initial operational efficiency reports and using one or more simulation engines, wherein the one or more validated efficiency reports comprises one or more refined efficiency-based modification parameters corresponding to the one or more efficiency-based modification parameters associated with the one or more initial operational efficiency reports; and initiate performance of one or more prediction-based actions based on the one or more validated efficiency reports, wherein the one or more prediction-based actions comprises programmatically adjusting the one or more operational parameters associated with the subsequent vehicle operation based on the one or more efficiency-based modification parameters.

2. The computing system of claim 1, wherein the machine learning efficiency framework comprises a machine learning anomaly detection model and a generative pre-trained model.

3. The computing system of claim 2, wherein the generative pre-trained model is a reinforcement-based model.

4. The computing system of claim 2, wherein the machine learning anomaly detection model is an unsupervised model that is trained based on historical operational data associated with a plurality of historical vehicle operations.

5. The computing system of claim 2, wherein the machine learning anomaly detection model is configured to analyze the operational data to generate anomaly data comprising one or more outlier data items associated with the operational data.

6. The computing system of claim 5, wherein the generative pre-trained model is configured to perform one or more scenario modeling tasks based on the anomaly data to generate the one or more efficiency-based modification parameters.

7. The computing system of claim 5, wherein the one or more outlier data items comprises raw data output from one or more sensors, wherein the generative pre-trained model is trained based on domain-specific data to acquire domain knowledge.

8. The computing system of claim 7, wherein the one or more processors are further configured to:

receive, from a computing entity, a query during the subsequent vehicle operation;

generate, using the generative pre-trained model, a query response corresponding to the query based on the domain knowledge associated with the generative pre-trained model; and provide the query response to the computing entity.

9. The computing system of claim 1, wherein the one or more prediction-based actions comprises causing display of at least a portion of the one or more validated efficiency reports on a user interface.

10. The computing system of claim 1, wherein the one or more prediction-based actions comprises causing one or more alerts to be transmitted to one or more computing entities.

11. The computing system of claim 1, wherein the at least one vehicle operation comprises an aircraft flight, wherein the operational data comprises flight data for the aircraft flight.

12. The computing system of claim 1, wherein the one or more validated efficiency reports comprises at least a subset of the one or more efficiency-based modification parameters.

13. A computer-implemented method comprising:

receiving, by one or more processors, operational data associated with at least one vehicle operation;

generating, by the one or more processors based on the operational data and using a machine learning efficiency framework, one or more initial operational efficiency reports comprising one or more efficiency-based modification parameters configured for adjusting one or more operational parameters associated with a subsequent vehicle operation;

generating, by the one or more processors, one or more validated efficiency reports based on the one or more initial operational efficiency reports and using one or more simulation engines, wherein the one or more validated efficiency reports comprises one or more refined efficiency-based modification parameters corresponding to the one or more efficiency-based modification parameters associated with the one or more initial operational efficiency reports; and initiating, by the one or more processors, performance of one or more prediction-based actions based on the one or more validated efficiency reports, wherein the one or more prediction-based actions comprises programmatically adjusting the one or more operational parameters associated with the subsequent vehicle operation based on the one or more efficiency-based modification parameters.

14. The computer-implemented method of claim 13, wherein the machine learning efficiency framework comprises a machine learning anomaly detection model and a generative pre-trained model.

15. The computer-implemented method of claim 14, wherein the generative pre-trained model is a reinforcement-based model.

16. The computer-implemented method of claim 14, wherein the machine learning anomaly detection model is an unsupervised model that is trained based on historical operational data associated with a plurality of historical vehicle operations.

17. The computer-implemented method of claim 14, wherein the machine learning anomaly detection model is configured to analyze the operational data to generate anomaly data comprising one or more outlier data items associated with the operational data.

18. The computer-implemented method of claim 17, wherein the generative pre-trained model is configured to perform one or more scenario modeling tasks based on the anomaly data to generate the one or more efficiency-based modification parameters.

* * * * *